(12) United States Patent
Forutanpour

(10) Patent No.: US 7,903,869 B2
(45) Date of Patent: Mar. 8, 2011

(54) AUTOMATIC COLOR REMOVAL IN DIGITALLY CAPTURED IMAGE TECHNICAL FIELD

(75) Inventor: Babak Forutanpour, Carlsbad, CA (US)

(73) Assignee: Qualcomm Incorporated, San Diego, CA (US)

( * ) Notice: Subject to any disclaimer, the term of this patent is extended or adjusted under 35 U.S.C. 154(b) by 1125 days.

(21) Appl. No.: 11/533,722

(22) Filed: Sep. 20, 2006

(65) Prior Publication Data

US 2008/0069440 A1 Mar. 20, 2008

(51) Int. Cl.
*G06K 9/00* (2006.01)

(52) U.S. Cl. .................. 382/162; 382/163; 382/167

(58) Field of Classification Search .......... 382/162, 382/163, 167, 133; 435/371, 40.5; 250/458.1; 715/723, 584; 356/4.01; 345/589, 600; 358/406, 358/500, 527, 540; 348/E5.058; 726/23, 726/22

See application file for complete search history.

(56) References Cited

U.S. PATENT DOCUMENTS

| | | | | |
|---|---|---|---|---|
| 5,296,935 A | * | 3/1994 | Bresler | 358/406 |
| 5,615,282 A | * | 3/1997 | Spiegel et al. | 382/167 |
| 5,940,530 A | | 8/1999 | Fukushima | |
| 6,414,690 B1 | * | 7/2002 | Balasubramanian et al. | 345/589 |
| 7,421,105 B2 | * | 9/2008 | Hirai et al. | 382/133 |
| 7,425,427 B2 | * | 9/2008 | Hirai et al. | 435/40.5 |
| 2002/0089514 A1 | | 7/2002 | Kitahara | |
| 2004/0165786 A1 | | 8/2004 | Zhang et al. | |
| 2004/0218069 A1 | | 11/2004 | Silverstein | |

FOREIGN PATENT DOCUMENTS

WO 02033957 4/2002

OTHER PUBLICATIONS

Zhang, Zhengyou et al., "White It! Convert Whiteboard Content into an Electronic Document," Microsoft Research, pp. 1-16 (2002).
International Search Report—PCT/US07/078778—International Search Authority—European Patent Office, Feb. 19, 2008.

* cited by examiner

*Primary Examiner* — Anh Hong Do

(57) ABSTRACT

In general, this disclosure relates to processing techniques for processing images captured by an image capture device. More particularly, the techniques relate to automatic color removal in digitally captured images. In accordance with this disclosure, an image processing apparatus dynamically determines whether a color component of an image is likely to be considered important by a human viewer based on color information associated with the image, and removes at least a portion of the color component of the image during image processing when it is not likely to be considered important.

47 Claims, 8 Drawing Sheets

AUTOMATIC COLOR REMOVAL IN DIGITALLY CAPTURED IMAGE TECHNICAL FIELD

TECHNICAL FIELD

This disclosure relates to image capture devices and, more particularly, to processing color images within image capture devices.

BACKGROUND

Image capture devices, such as digital video cameras or digital still image cameras, are capable of producing high quality, high resolution images. In addition, digital video cameras and digital still image cameras are typically equipped with auto focus features, and can achieve a greater depth of field than conventional desktop scanners. Such features allow digital cameras to capture text or drawings from a distance, unlike conventional scanners. For example, a digital camera may be used to capture notes or drawings on a whiteboard, chalkboard, overhead projector slide, textual document or the like. For these reasons, digital cameras are highly useful in generating electronic documents of such objects.

Use of image capture devices to electronically capture physical objects, such as whiteboard content, has some drawbacks. For example, images captured by image capture devices often include artifacts or flaws, such as lighting variations, skewed camera angles, noise, blurring, shadows, reflections or other imperfections in the image. A number of approaches have been developed to remove such imperfections. For example, an image processor may perform white balancing, adjust image aspect ratio, enhance contrast, or the like. These processing techniques improve image quality and make the image more aesthetically pleasing to the viewer.

SUMMARY

In general, this disclosure relates to processing techniques for processing images captured by an image capture device. More particularly, the techniques relate to automatic color removal in digitally captured images. In accordance with this disclosure, an image processing apparatus dynamically determines whether a color component of an image is likely to be considered important by a human viewer based on color information associated with the image, and removes at least a portion of the color component of the image during image processing when it is not likely to be considered important.

In one embodiment, a method comprises analyzing color information associated with pixels of at least a portion of an image and determining whether to preserve a color component of the image based on the analysis.

In another embodiment, a device comprises a processor configured to analyze color information associated with pixels of at least a portion of an image and determine whether to preserve a color component of the image based on the analysis.

In further embodiment, a computer-readable medium containing instructions. The instructions cause a programmable processor to analyze color information associated with pixels of at least a portion of an image and determine whether to preserve a color component of the image based on the analysis.

In yet another embodiment, a device comprises an image capture apparatus that captures an image of a scene of interest and an image processing apparatus that analyzes color information associated with pixels of at least a portion of the image and determines whether to preserve a color component of the image based on the analysis.

In a further embodiment, an apparatus comprises means for analyzing color information associated with pixels of at least a portion of an image and means for determining whether to preserve a color component of the image based on the analysis.

The details of one or more embodiments are set forth in the accompanying drawings and the description below. Other features, objects, and advantages will be apparent from the description and drawings, and from the claims.

DETAILED DESCRIPTION

Figure 1:
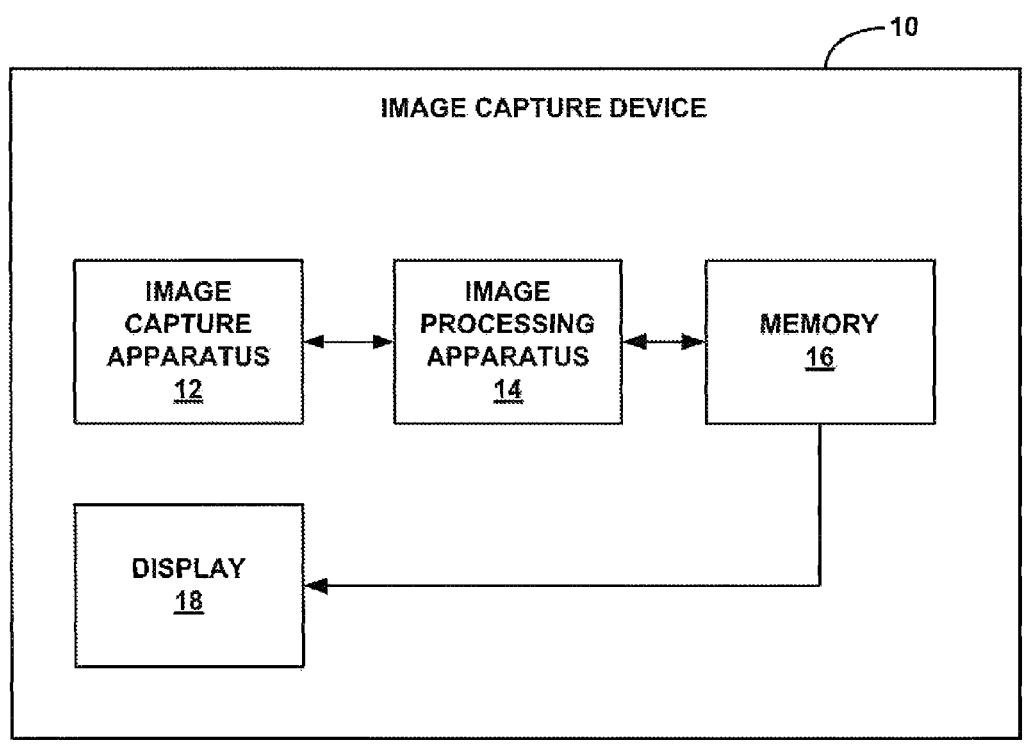
FIG. 1 is a block diagram illustrating an image capture device that dynamically determines whether to remove at least a portion of a color component of an image during image processing based on color information of the image.

In general, this disclosure relates to processing techniques for processing images captured by an image capture device. More particularly, the techniques relate to automatic color removal in digitally captured images. In accordance with this disclosure, an image processing apparatus dynamically determines whether a color component of an image is likely to be considered important by a human viewer based on color information associated with the image, and removes at least a portion of the color component of the image during image processing when it is not likely to be considered important.

Conventional image processing techniques either automatically preserve the color component of the image or automatically remove the color component of the image during image processing. Thus, conventional image processing techniques assume that color is either always important or never important. The image processing techniques of this disclosure dynamically determine whether to remove at least a portion of the color component of an image by analyzing color information associated with the image. In this manner, the image capture device preserves the color component of the image when the color component is determined to be important while eliminating some or all of the color components of the image when the color component is determined to be unimportant.

For example, the image processing apparatus may analyze color information associated with pixels of at least a portion of the image to decide whether to preserve a color component of the image during image processing. The image processing apparatus may, for example, classify each pixel of the selected portion of the image as a color pixel or non-color pixel based on a computed difference between Cb and Cr chrominance values associated with each of the pixels, and decide to preserve the color component of the image when the number of color pixels within the selected portion of the image is within a color preservation range. If the number of color pixels is not within the color preservation range, the image processing apparatus either eliminates the color component of the image (e.g., by converting the image to grayscale) or reduces the number of tones of color in the image (e.g., by performing posterization).

Eliminating or reducing the color components of the image when the color components are not important results in images that are more printer friendly and compress better to create smaller file sizes. In some cases, the file size may be reduced to at little as one-third of the original size. Smaller file sizes may be particularly advantageous in mobile wireless communication devices, such as so-called camera phones, because of the limited amount of memory typically available for storage of digital images within the device. Moreover, in wireless communication devices capable of sending and receiving images over a wireless network, the reduced file size results in faster and more efficient transmission and reception of images, particularly for wireless plans that include per byte surcharges for sending or receiving content from the Internet, e.g., via electronic mail (email) or multimedia messages (MMS).

FIG. 1 is a block diagram illustrating an image capture device 10 that may implement automatic color removal techniques in accordance with this disclosure. Image capture device 10 may be a digital camera, such as a digital video camera, a digital still image camera, or a combination of both. In addition, image capture device 10 may be a stand-alone device, such as a stand-alone camera, or be integrated in another device, such as a wireless communication device. As an example, image capture device 10 may be integrated in a mobile telephone to form a so-called camera phone or video phone. Although the techniques described in this disclosure may be generally applicable to captured digital video, application of such techniques to digital still images will be described for purposes of illustration.

As shown in FIG. 1, image capture device 10 includes an image capture apparatus 12 to capture image data associated with a scene of interest. Image capture apparatus 12 may capture still images, or possibly full motion video sequences, in which case image processing may be performed on one or more image frames of the video sequence. The techniques of this disclosure may be particularly advantageous for processing captured images of combined graphical/textual documents, such as the contents of a whiteboard, chalkboard, posterboard, or overhead projection slide, or the like. Image capture apparatus 12 may comprise an array of solid state sensor elements such as complementary metal-oxide semiconductor (CMOS) sensor elements, charge coupled device (CCD) sensor elements, or the like. Additionally, image capture apparatus may comprise a set of image sensors that include color filter arrays (CFAs) arranged on a surface of the respective sensors. Other types of image sensors, however, could also be used to capture image data.

Image capture device 10 also includes an image processing apparatus 14 to store raw image data and perform various processing techniques on the stored data. Image processing apparatus 14 may be coupled directly to image capture apparatus 12 to avoid latency in the image processing. Alternatively, image capture apparatus 12 may store the raw image data in memory 16 or a storage device, and image processing apparatus 14 may retrieve the stored raw image data for processing.

Image processing apparatus 14 processes the captured image data according to the techniques of this disclosure. In particular, as described in greater detail below, image processing apparatus 14 analyzes color information associated with pixels of at least a portion of the image to decide whether to preserve, remove, or convert a color component of the image during image processing. Image processing apparatus 14 may, for example, classify each pixel of the portion of the image as a color pixel or non-color pixel based on the analysis of the color information associated with each of the pixels, and decide to preserve the color component of the image when the number of color pixels within the selected portion of the image is greater than a first threshold and less than a second threshold. The first and second thresholds may define a color preservation range. If the color component of the image is not within the color preservation range, i.e., the number of color pixels is either above or below the respective thresholds, image processing apparatus 14 either eliminates the color component of the image or reduces the number of tones of color in the image. Elimination of the color component may involve conversion of the image to grayscale. Reducing the number of tones of color may be referred to as posterization. In this manner, image processing apparatus 14 dynamically determines whether a human viewer is likely to consider the color component of the image data to be important, and removes at least a portion of the color component when it is not important.

Hence, the determination of whether to apply color elimination, color posterization, or color preservation depends on a pixel-based analysis of the captured image, and will vary from image to image. Automatically determining whether to remove at least a portion of the color component of an image allows image capture device 10 to preserve the color component of the image when the color component is determined to be important while eliminating or reducing the color components of the image when the color component is not determined to be important. As mentioned previously, eliminating or reducing the color components of the image when the color components are not determined to be important results in images that are more printer friendly and compress better to create smaller files sizes, sometimes reducing the file size to as little as one-third of the original size. Smaller file sizes may be particularly advantageous in wireless communication devices for memory conservation. In addition, smaller image files promote more efficient electronic transmission over wireless or wired media. The image processing techniques may also result in images that are better suited for optical character recognition (OCR) software which can create ASCII text of the digitized notes.

Image processing apparatus 14 may be realized by a microprocessor, digital signal processor (DSP), application specification integrated circuit (ASIC), field programmable gate array (FPGA), or any other equivalent discrete or integrated logic circuitry, or a combination thereof. In some embodiments, image processing apparatus 14 may form part of an encoder-decoder (CODEC) that encodes the image information according to a particular encoding technique or format, such as MPEG-2, MPEG-4, ITU H.263, ITU H.264, JPEG, GIF, TIFF, or the like.

Image processing apparatus 14 stores the image data in memory 16. Image processing apparatus 14 may store raw image data, processed image data, and/or encoded data in memory 16. If the image data is accompanied by audio data, the audio also may be stored in memory 16, either independently or in conjunction with the video data. Memory 16 may comprise any volatile or non-volatile memory or storage device, such as read-only memory (ROM), electrically erasable programmable read-only memory (EEPROM), or FLASH memory, or such as a magnetic data storage device or optical data storage device.

Image capture device 10 may include a display 18 that displays an image following the image processing described in this disclosure. For example, after processing the images to eliminate, convert, or preserve the color component, image captured device 10 may send the processed image to display 18 for presentation to the user. Display 18 may comprise a liquid crystal display (LCD), a cathode ray tube (CRT), a plasma display, an organic light emitting diode (OLED) display, or the like.

Image capture device 10 may also include a transmitter (not shown) to transmit the processed images or coded sequences of images to another device. Indeed, the techniques of this disclosure may be very useful for handheld wireless communication devices (such as so-called cell-phones) that include digital camera functionality or digital video capabilities.

A number of other elements may also be included in image capture device 10, but are not specifically illustrated in FIG. 1 for simplicity and ease of illustration. The architecture illustrated in FIG. 1 is merely exemplary, as the techniques described herein may be implemented with a variety of other architectures. Moreover, the features illustrated in FIG. 1 may be realized by any suitable combination of hardware and/or software components.

Figure 2:
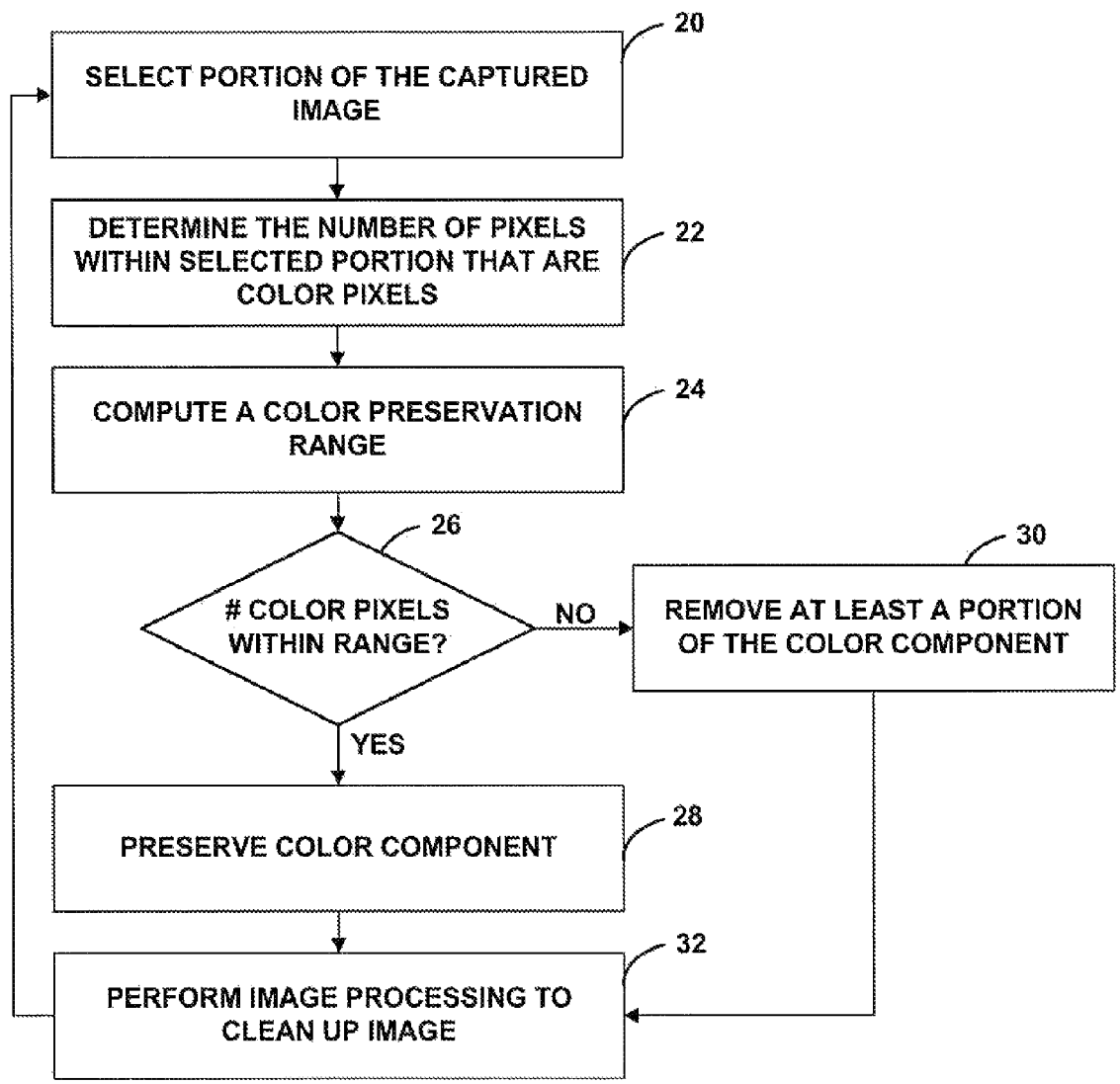
FIG. 2 is a flow diagram illustrating an exemplary technique for dynamically determining the importance of a color component of a captured image and processing the image based on the importance of the color component.

FIG. 2 is a flow diagram illustrating an exemplary technique for dynamically determining the importance of a color component of a captured image and processing the image based on the importance of the color component. Initially, image processing apparatus 14 selects a portion of the image to analyze the color component (20). Image processing apparatus 14 may, for example, select pixels of a central portion of the image. In one embodiment, image processing apparatus 14 selects a central portion of pixels having a width and height of three-sevenths of the original width and height. For an image having a resolution of 800×600 pixels, for example, image processing apparatus 14 may select a 340×260 central portion of pixels. Image processing apparatus 14 may select the central portion of the image because the central portion of the image usually contains the object of interest. In other words, image processing apparatus 14 may assume that the user of image capture device 10 captured the image such that the item of interest is centered in the image.

Dynamically determining whether the color component of the item of interest is important using only the central portion of the image allows image processing apparatus 14 to ignore the color component of irrelevant items in making the determination. In an image that includes a whiteboard and a professor standing next the whiteboard, for example, image processing apparatus 14 may ignore the pixels associated with the professor and possibly other irrelevant items (e.g., poster on the wall next to the whiteboard) by only utilizing the pixels in the central portion of the image. In this manner, image processing apparatus 14 determines the importance of the color component of the image based on the pixels most likely associated with the item of interest, instead of based on the pixels associated with surrounding, non-relevant items. Alternatively, image processing apparatus 14 may select a larger or smaller central portion of the image, a non-central portion of the image, or the entire image to analyze color information.

Image processing apparatus 14 then determines the number of pixels within the selected portion of the image that are color pixels (22). In other words, image processing apparatus 14 analyzes the selected portion of the image on a pixel-by-pixel basis to determine the number of color pixels, i.e., the number of pixels that represent a non-black or non-white color. In one embodiment, image processing apparatus 14 may analyze chrominance components of each pixel to determine whether the pixel is a color pixel. For example, image processing apparatus 14 may compute differences between Cb and Cr chrominance values associated with each of the pixels, and classify the pixels whose absolute value of the difference is greater than a chrominance threshold (e.g., 30 on an 8-bit scale) as a color pixel. Image processing apparatus 14 classifies pixels that have an absolute value that is less than the chrominance threshold as non-color pixels, e.g., black, gray or white pixels. As another example, image processing apparatus 14 may compute the difference between one or both of the Cb and Cr chrominance values and a chrominance value corresponding to no chrominance (e.g., a chrominance value associated with black or white) for each pixel, and classify pixels whose difference is greater than a chrominance threshold as color pixels.

Alternatively, image processing apparatus 14 may determine whether a pixel is a color pixel using color information of a different color model, such as red-green-blue (RGB) values. For example, image processing apparatus 14 may sum absolute value of the differences between each of the RGB values and the other RGB values, i.e., according to the equation $|G-R|+|G-B|+|B-R|$. If the sum of the differences exceeds a threshold then the pixel is a color pixel; otherwise the pixel is a non-color pixel.

Image processing apparatus 14 may also compute a color preservation range (24). Image processing apparatus 14 may compute the color preservation range based on the total number of pixels in the selected region. In particular, image processing apparatus 14 may compute the minimum and maximum values of the range as a percentage of the total number of pixels in the selected region. For example, image processing apparatus 14 may compute the minimum threshold to be one-sixty-fourth of the total number of pixels in the selected portion of the image and the maximum threshold to be one-twelfth of the total number of pixels in the selected portion of the image. Using the example 340×260 selected region described above, the minimum and maximum thresholds would be 1381 pixels and 7366 pixels, respectively, thus resulting in a color preservation range between 1381-7366 color pixels. Alternatively, image processing apparatus 14 may compute the minimum and maximum threshold values in advance based on the resolution image capture device.

In either case, if the number of color pixels falls within the color preservation range, color will be preserved. If the number of color pixels is below or above the color preservation range, however, image processing apparatus 14 will either eliminate or posterize the color component. Image processing apparatus 14 may be configured statically to either eliminate or posterize the color component when the color pixel count is outside of the color preservation range. Alternatively, image processing apparatus 14 may be configured to dynamically select either elimination or posterization depending on the value of the color pixel count or other characteristics observed in the analysis.

With further reference to FIG. 2, image processing apparatus 14 compares the number of color pixels of the selected region to the color preservation range (26). If the number of color pixels of the selected region is within the range, i.e., greater than the minimum threshold number of pixels and less than the maximum threshold number of pixels, image processing apparatus 14 preserves the color component of the image (28).

If the number of color pixels of the selected region is outside of the color preservation range, i.e., greater than the maximum threshold number of pixels or less than the minimum threshold number of pixels, image processing apparatus 14 removes at least a portion of the color component of the image during (30). As described above, if the number of pixels in the selected region is less than the minimum threshold the image does not include enough color information for the color information to be of significant importance. Thus, image processing apparatus 14 assumes the information is not of sufficient importance. Likewise, if an image contains too much color information, image processing apparatus 14 assumes the color information is also likely to be of limited importance. In fact, the large amount of color information may actually be distracting to a viewer of the image.

Image processing apparatus 14 may remove at least a portion of the color component by eliminating the color component of the image or a portion of the image. In other words, image processing apparatus 14 may convert the image to grayscale. Image processing apparatus 14, for example, converts all the color components of the image to a shade of gray by calculating the effective luminance or brightness of the color and using the calculated value to a create a shade of gray that matches the desired brightness or luminance. Alternatively, image processing apparatus 14 may remove at least a portion of the color component of the image by reducing the number of tones of color in the image (i.e., posterizing the image). Image processing apparatus 14 may posterize the image by dividing every pixels color components by a number (commonly a multiple of two), dropping the remainder and then multiplying by the same number. If the red, green and blue color components have a color range from 0 to 256 in steps of one, we could posterize the image to adjust the step size of the range to two, i.e., only 128 color values represent the range from 0-256. In other words, a plurality of color component values map to the same color tone. For example, image processing apparatus 14 may posterize the image by a factor of two so that two color component values map to a single color tone. For color tone values of 150 and 151, for instance, 150/2=75, 75*2=150 and 151/2=75 (after remainder is removed), 75*2=150. Thus, color component values of 150 and 151 both map to color tone 150. Image processing apparatus 14 may posterize the image by factors other than two, e.g., four, eight, twelve, etc. In the case of posterization by eight, eight color component values map to a single color tone.

Whether the color component of the image is preserved or at least partially removed, image processing apparatus 14 may further process the image in order to "clean up" the image (32). Image processing apparatus 14 may, for example, perform white balancing, adjust image aspect ratio, enhance contrast, or other processing techniques that remove lighting variations, skewed camera angles, noise, blurring, shadows, reflections or other imperfections in the image. In this manner, image processing apparatus 14 may clean up the image to make the image easier to read and more aesthetically pleasing. In one embodiment, image processing apparatus 14 may blur the image to remove detail and subtract the blurred image from the original image. Image processing apparatus 14 identifies portions of the image in which there are large differences as fine details, such as text or drawings, and portions where there is little difference as unimportant features. Image processing apparatus 14 may concentrate the image processing on the portions of the image identified as fine details while ignoring the unimportant features.

Figure 3:
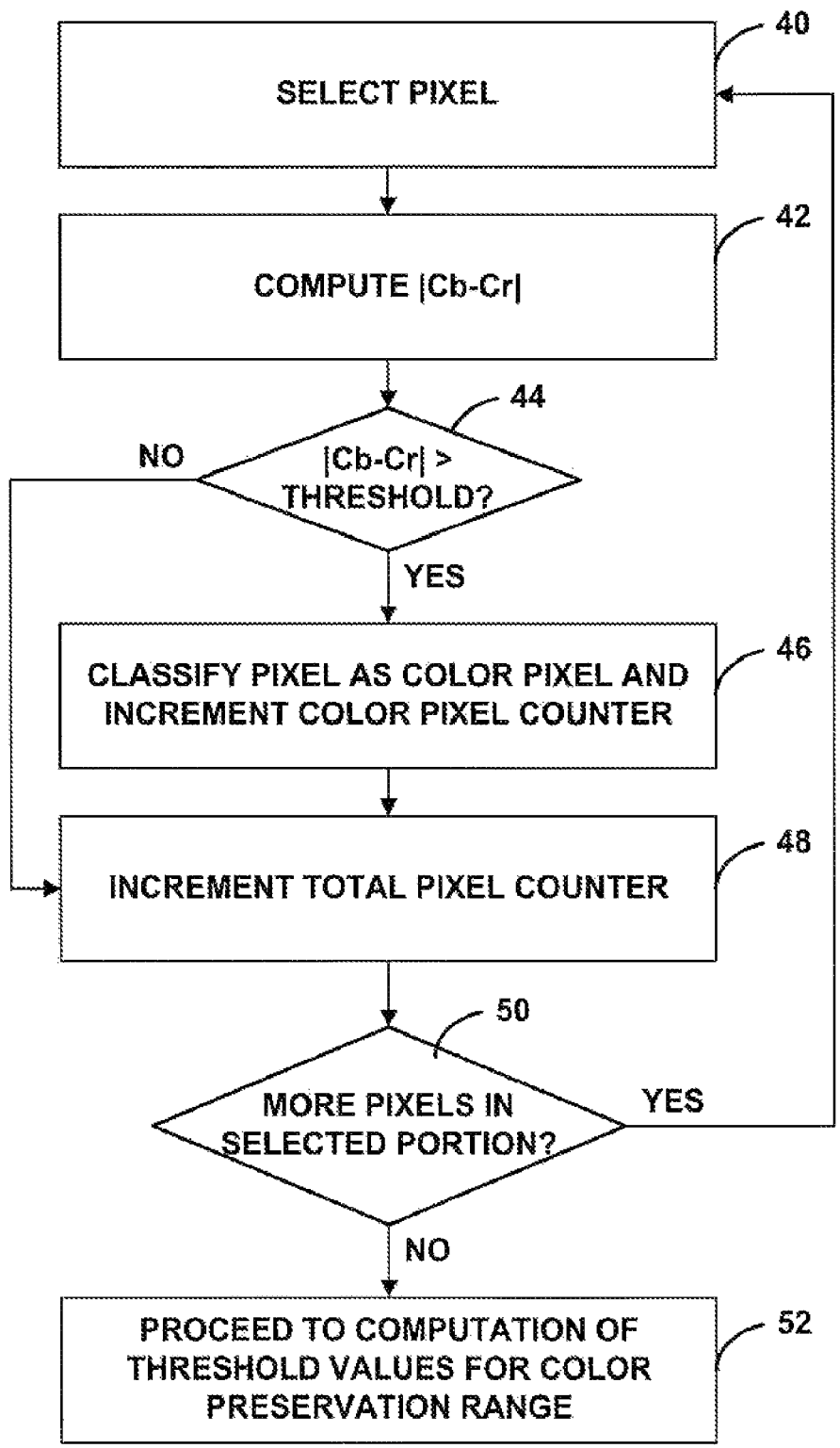
FIG. 3 is a flow diagram illustrating an exemplary technique for analyzing color information associated with pixels of a portion of the image to decide whether to preserve color component of the image.

FIG. 3 is a flow diagram illustrating an exemplary technique analyzing color information associated with pixels of the portion of the image to decide whether to preserve a color component of the image. More specifically, the flow diagram illustrates exemplary operation of image processing apparatus 14 in computing the number of color pixels within a selected portion of an image. Image processing apparatus 14 selects a first pixel from the pixels within the selected portion of the image (40). Image processing apparatus 14 computes a difference between a first and second chrominance value associated with the selected pixel (42). Image processing apparatus 14 may, for example, compute the difference between Cb and Cr chrominance values associated with the selected pixel. Image processing apparatus 14 compares the absolute value of the computed difference between the chrominance values to a chrominance threshold (44). As one example, the chrominance threshold value may be thirty. Other chrominance threshold values may be selected depending on the application.

If the computed difference between the first and second chrominance values does not exceed the chrominance threshold, image processing apparatus 14 classifies the pixel as a non-color pixel. Image processing apparatus 14 increments a pixel counter that tracks the number of pixels that have been analyzed in the selected portion of the image (48).

If the computed difference between the first and second chrominance values exceeds the chrominance threshold, image processing apparatus 14 classifies the pixel as a color pixel and increments a color pixel counter (46). The color pixel counter tracks the number of color pixels within the selected portion of the image. After incrementing the color pixel counter, image processing apparatus increments the total pixel counter (48). The total pixel counter tracks the number of pixels that have been analyzed in the selected portion of the image. As described above, image processing apparatus 14 utilizes the values of the color pixel counter (i.e., the number of color pixels located in the selected region) to determine whether to preserve the color component of an image. In one embodiment, image processing apparatus 14 compares the value of the color pixel counter to a range that is a function of the total pixel counter.

Image processing apparatus 14 then determines whether there are any additional pixels within the selected portion of the image to analyze (50). If there are additional pixels within the selected portion to analyze, image processing apparatus 14 selects the next pixel and analyzes the color component of the pixel as described above. If there are no additional pixels within the selected portion to analyze, image processing apparatus 14 proceeds to compute the threshold values of the color preservation range (52). As described above with reference to block 24 of FIG. 2, the threshold values of the color preservation range may be computed as a function of the total number of pixels in the selected region. In other words image processing apparatus 14 may use the value in the total pixel counter to determine the threshold values of the color preservation range. In this manner, image processing apparatus 14 analyzes color information associated with each pixel of the portion of the image to determine whether to classify each pixel as a color pixel.

FIG. 3 illustrates the operation of image processing apparatus 14 in analyzing the color information associated with the pixels of the selected portion of the image using the difference between Cb and Cr chrominance values associated with each of the pixels for exemplary purposes. As described above, image processing apparatus 14 may analyze the Cb and Cr chrominance values associated with the pixels using different computations. For example, image processing apparatus 14 may compute the difference between at least one of the Cb and Cr chrominance values and a chrominance value corresponding to no chrominance (e.g., a chrominance value associated with black or white), and classify the pixels if the computed difference exceeds a chrominance threshold. Moreover, image processing apparatus 14 may analyze color information associated with the pixels using color information in different color modes (e.g., red-green-blue (RGB) color information). As described above, image processing apparatus 14 may compute a value according to the equation |G−R|+|G−B|+|B−R|, and compare that value to a threshold to classify the pixels.

Figure 4:
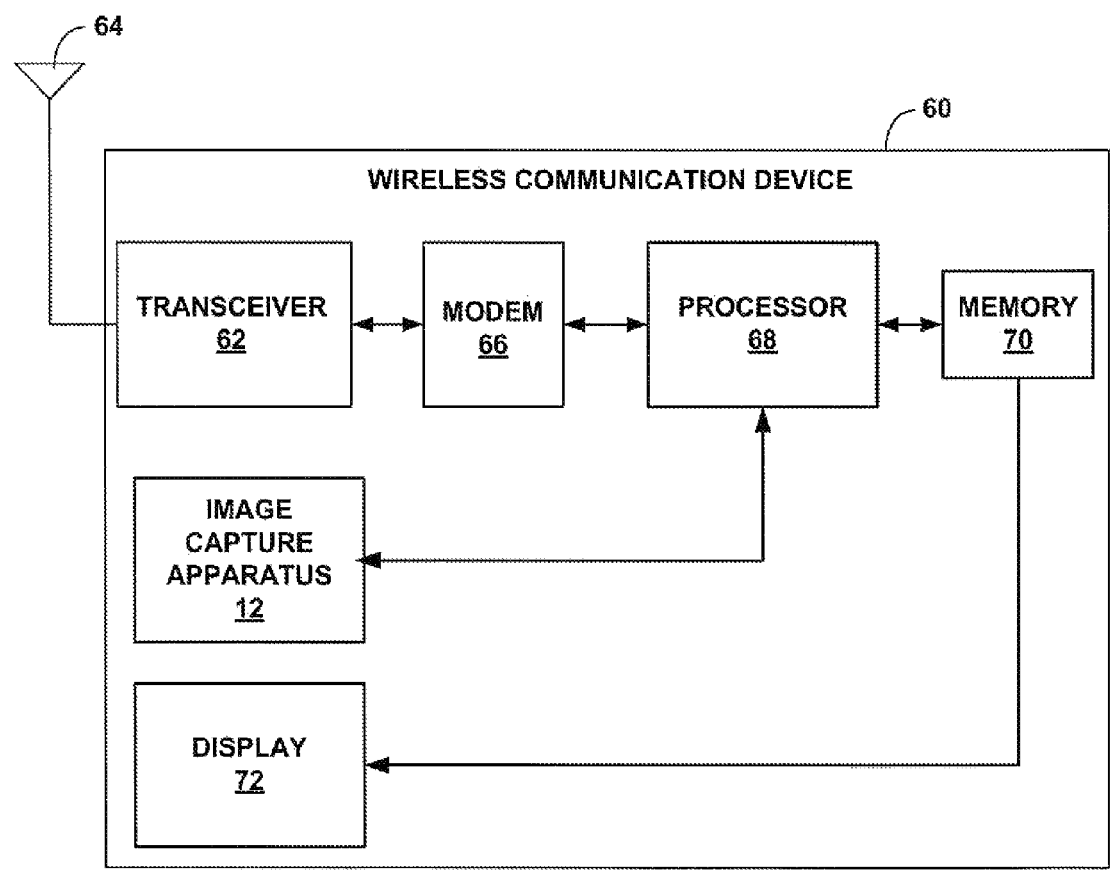
FIG. 4 is a block diagram illustrating a wireless communication device that dynamically determines whether to remove at least a portion of a color component of an image during image processing based on color information of the image.

FIG. 4 is a block diagram illustrating a wireless communication device 60 that may implement the techniques of this disclosure. Wireless communication device 60 may be a mobile or satellite radio telephone, a personal digital assistant (PDA) or any communication device with imaging or video capabilities in which image processing is desirable.

Wireless communication device 60 includes a transceiver 62 to transmit and receive information via an antenna 64. Transceiver 62 may use antenna 64 to transmit information to and receive information from one or more base stations (not shown). Transceiver 62 may, for example, transmit and receive voice information, electronic mail (e-mail), text messages, multimedia messages (MMS), radio signals and other information. Transceiver 62 includes circuitry for upconverting transmitted signals to RF, and downconverting RF signals to baseband signals. Although in the exemplary embodiment illustrated in FIG. 4 transceiver 62 comprises a single component, transceiver 62 may be realized by separate transmitter and receiver components.

Wireless communication device 60 also includes a modulator-demodulator (modem) 66 to facilitate wireless modulation of baseband signals onto a carrier waveform in order facilitate wireless communication of the modulated information. In particular, modem 66 encodes information in a baseband signal for upconversion to the RF band by transceiver 62 and transmission via antenna 64. Similarly, modem 66 decodes information from RF signals received via antenna 64 and downconverted to baseband by transceiver 62.

Wireless communication device 60 also includes an image capture apparatus 12 to capture image data associated with a scene of interest. Image capture apparatus 12 is integrated within wireless communication device 60. Image capture device 60 may, for example, comprise a so-called camera phone. Image capture apparatus 12 may comprise arrays of solid state sensor elements such as complementary metal-oxide semiconductor (CMOS) sensor elements, charge coupled device (CCD) sensor elements, or the like. Image capture apparatus 12 may capture still images, or possibly full motion video sequences, in which case image processing may be performed on one or more image frames of the video sequence.

Wireless communication device 60 includes a processor 68 that performs processing functions for wireless communication device 60. Processor 68 may, for example, perform signal processing to decode signals from modem 66. Additionally, processor 68 also performs image processing on image data captured by image capture apparatus 12, including dynamically determining whether a color component of the image is important by analyzing color information associated with pixels of at least a portion of the image and removing at least a portion of the color component when it is not important. Thus, image processing apparatus 14 of FIG. 1 may be integrated with, or embedded in, a programmable feature of processor 68. Alternatively, wireless communication device 60 may include separate, dedicated processors. For example, wireless communication device 60 may include a first processor for performing signal processing of received communication signals and a second processor for performing image processing functions on a captured image.

Processor 68 may, for example, classify each pixel of the portion of the image as a color pixel or non-color pixel based on the analysis of the Cb and Cr chrominance values associated with each of the pixels, and decide to preserve the color component of the image when the number of color pixels within the selected portion of the image is within a color preservation range. If the number of color pixels is not within the color preservation range, processor 68 either eliminates the color component of the image (i.e., converts the image to grayscale) or reduces the number of tones of color in the image (i.e., performs posterization). Processor 68 may be realized by one or more microprocessors, digital signal processors (DSPs), application specification integrated circuits (ASICs), field programmable gate array (FPGAs), or any other equivalent discrete or integrated logic circuitry, or a combination thereof.

Eliminating or reducing the color components of the image when the color components are not determined to be important may be particularly advantageous for wireless communication devices, such as wireless communication device 60. Eliminating or reducing the number of color components allows for better compression to create smaller files sizes, sometimes reducing the file size up to one-third of the original size. Smaller file sizes may be particularly advantageous in wireless communication devices, such as camera phones, because of the limited amount of memory available for storage of digital images within the device. Moreover, in wireless communication devices capable of sending and receiving images over a wireless network, the reduced file size results in faster and cheaper transmission and reception of images, particularly for wireless plans that include per byte surcharges for sending or receiving content from the Internet (e.g., email or MMS).

Processor 68 stores the image data in memory 70. Processor 68 may store raw image data, processed image data, or encoded data in memory 70. If the image data is accompanied by audio data, the audio also may be stored in memory 70, either independently or in conjunction with the video data. Memory 70 may comprise any volatile or non-volatile memory or storage device, such as read-only memory (ROM), electrically erasable programmable read-only memory (EEPROM), or FLASH memory, or such as a magnetic data storage device or optical data storage device.

Wireless communication device 60 may also include a display 72. Display 72 may display to a user numerous sorts of information. As one example, display 72 displays an image following the image processing described in this disclosure. Display 72 may comprise a liquid crystal display (LCD), a cathode ray tube (CRT), a plasma display, OLED display, or the like.

A number of other elements may also be included in wireless communication device 60, but are not specifically illustrated in FIG. 4 for simplicity and ease of illustration. The architecture illustrated in FIG. 4 is merely exemplary, as the techniques described herein may be implemented with a variety of other architectures. Moreover, the features illustrated in FIG. 4 may be realized by any suitable combination of hardware and/or software components.

Figure 5:
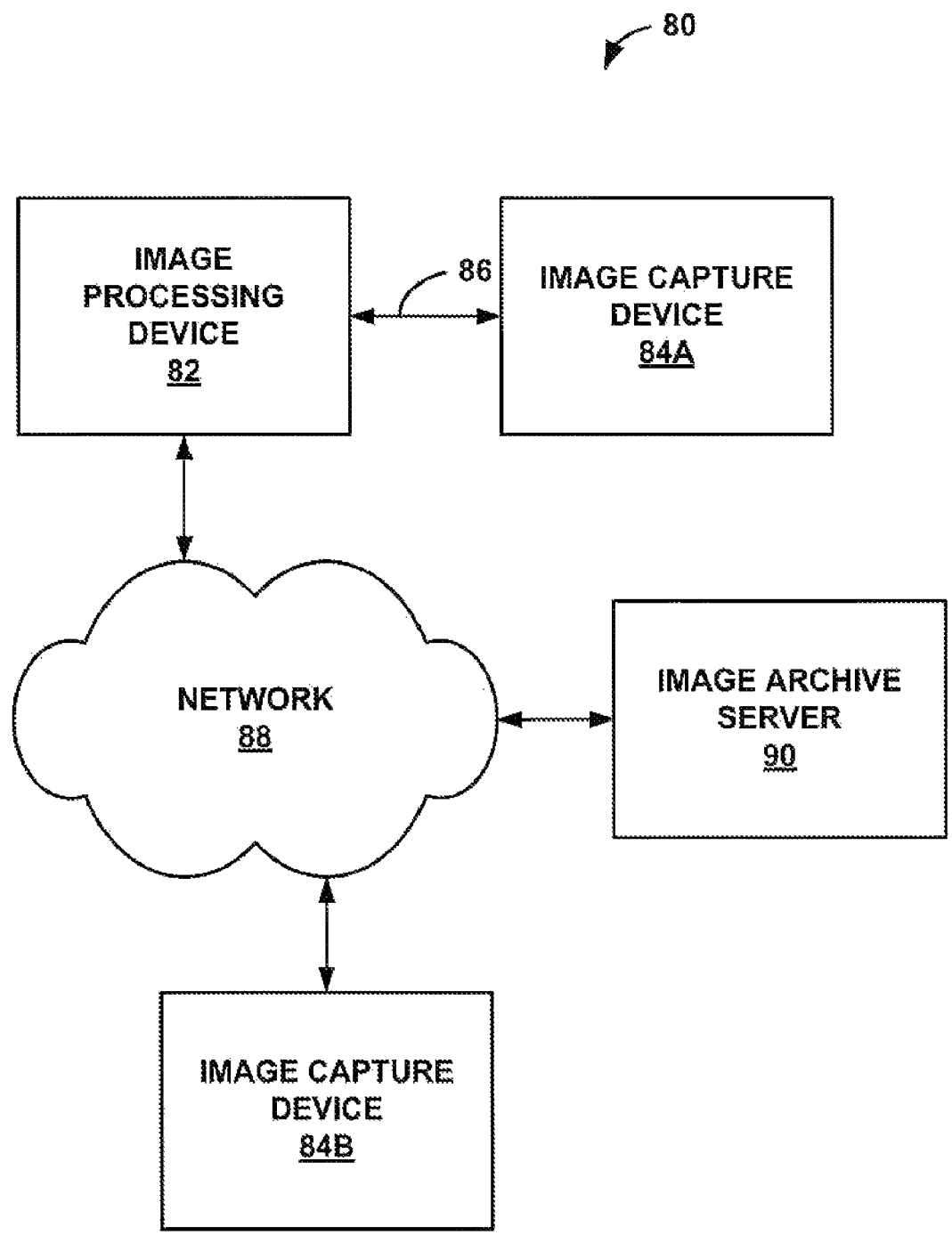
FIG. 5 is a block diagram illustrating a system that dynamically determines whether to remove at least a portion of a color component of an image during image processing based on color information of the image.

FIG. 5 is a block diagram illustrating a system 80 that may implement the techniques of this disclosure. System 80 includes an image processing device 82 coupled to image capture devices 84A and 84B (collectively, "image capture devices 84"). Image processing device 82 is directly coupled to image capture device 84A via a communication link 86. Communication link 86 may be a wired link, such as a USB cable, or a wireless link, such as an infrared link. Image processing device 82 is also coupled to image capture device 84B over a network 88, such as the Internet, a wireless network or a combination of different networks.

Image capture devices 84 capture images associated with a scene of interest using an array of sensor elements (not shown), such as CMOS sensor elements or CCD sensor elements. Image capture devices 84 may be digital cameras, such as digital video cameras, digital still image cameras, or a combination of both. Alternatively, image capture devices 84 may be wireless communication devices with image capture capabilities integrated therein, such as a so-called camera phones.

Image capture devices 84 transmit the captured image data to image processing device 82 for image processing. Image capture device 84A may, for example, couple to image processing device 82 via a USB cable and transmit the image data to image processing device 82 via the USB cable. In other words, image capture device 84A may directly upload the images to image processing device 82. Image capture device 84B may send the image data via email or multimedia messaging service (MMS), or upload the image data to image processing device 82 via network 88.

Image processing device 82 processes the images in accordance with the techniques of this disclosure. As described above, image processing device 82 analyzes color information associated with pixels of at least a portion of the image to decide whether to preserve color component of the image during image processing. Image processing device 82 may, for example, classify each pixel of the portion of the image as a color pixel or non-color pixel based on the analysis of the Cb and Cr chrominance values associated with each of the pixels, and decide to preserve the color component of the image when the number of color pixels within the selected portion of the image is within a color preservation range. If the number of color pixels is not within the color preservation range, image processing device 82 either eliminates the color component of the image (i.e., converts the image to grayscale) or reduces the number of tones of color in the image (i.e., performs posterization). In this manner, image processing device 82 dynamically determines whether a color component of the image and removes at least a portion of the color component when it is not important, thus allowing for better compression to create smaller files sizes.

Additionally, image processing device 82 may perform white balancing, adjust image aspect ratio, enhance contrast, or other processing techniques that remove lighting variations, skewed camera angles, noise, blurring, shadows, reflections or other imperfections in the image. Thus, image processing device 82 may performs a number of image processing techniques to improve image quality and make the image more aesthetically pleasing to the viewer. After performing the processing, image processing device 82 transmits the processed image back to the respective one of image capture devices 84. In particular, image processing device 82 may directly transfer the image to image capture device 84A, and send the image data via email, MMS or fax, or transmit the processed image data to image capture device 84B via network 86. Alternatively, image processing device 82 may transmit the image information to another device, such as a different image capture device or a device that does not have image capture functionality (e.g., a regular cell phone, a fax machine or a personal computer). In addition, image processing device 82 or image capture devices 84 may transmit the image information to an image archive server 90 that archives the images for later viewing, printing, purchasing or the like.

Figure 6:
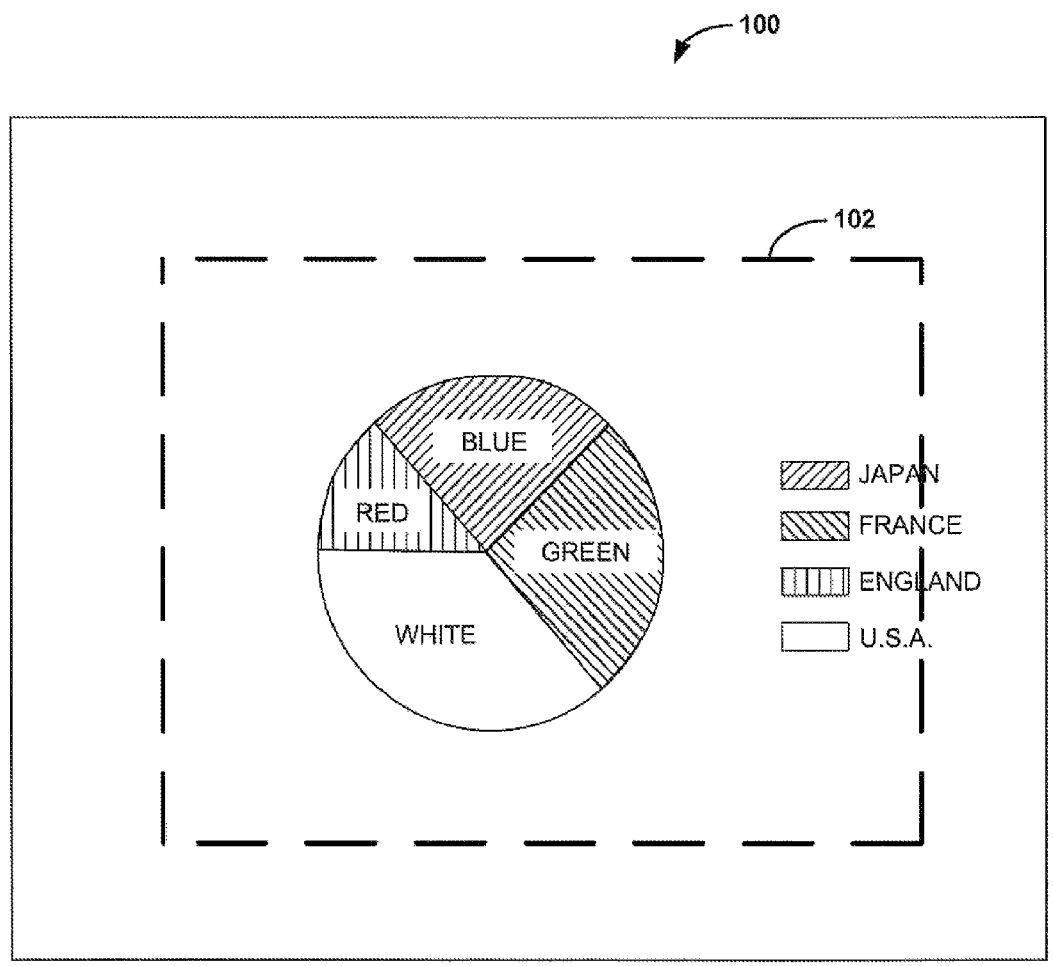
FIGS. 6-8 are exemplary images to which the automatic color removal techniques of this disclosure are applied.

FIG. 6 is an exemplary image 100 to which the automatic color removal techniques of this disclosure may be applied. Image 100 of FIG. 6 represents a captured image of contents of a whiteboard. Image 100 is an image of a pie chart and a key to the pie chart. The pie chart includes four sections; a red section, a blue section, a green section and a white section. In addition, image 100 includes a key to the pie chart in which each key block is the same color as its respective portion of the pie chart.

An image processing apparatus, such as image processing apparatus 14, processes image 100 in accordance with the techniques of this disclosure. In particular, image processing apparatus 14 analyzes color information associated with pixels within a selected portion of image 100 to decide whether to preserve a color component of image 100 during image processing. In the example illustrated in FIG. 6, image processing apparatus 14 analyzes color information associated with pixels within box 102.

Image processing apparatus 14 may, for example, classify each pixel of within box 102 of image 100 as a color pixel or non-color pixel based on the analysis of Cb and Cr chrominance values associated with each of the pixels, and decide to preserve the color component of image 100 when the number of color pixels within the selected portion of image 100 is within a color preservation range. In the case of image 100, image processing apparatus 14 classifies each of the pixels within the red, blue and green sections of the pie chart and their respective keys as color pixels. Image processing apparatus 14 classifies all other pixels within box 102 as non-color pixels because they are either white, gray or black pixels. If the number of color pixels is within the color preservation range, image processing apparatus 14 preserves the color component of image 100. In the case of image 100, the number of color pixels is within the color preservation range. For example, the number of color pixels within box 102 is between ⅟64 and ⅟12 of the total pixels within box 102. Thus, image processing apparatus 14 dynamically determines that the color component of image 100 is likely to be considered important to a human viewer and preserves the color component of the image.

Additionally, image processing apparatus 14 may perform white balancing, adjust image aspect ratio, enhance contrast, or other processing techniques that remove lighting variations, skewed camera angles, noise, blurring, shadows, reflections or other imperfections in the image. Thus, image processing apparatus 14 may perform a number of image processing techniques to improve image quality and make the image more aesthetically pleasing to the viewer.

Figure 7:
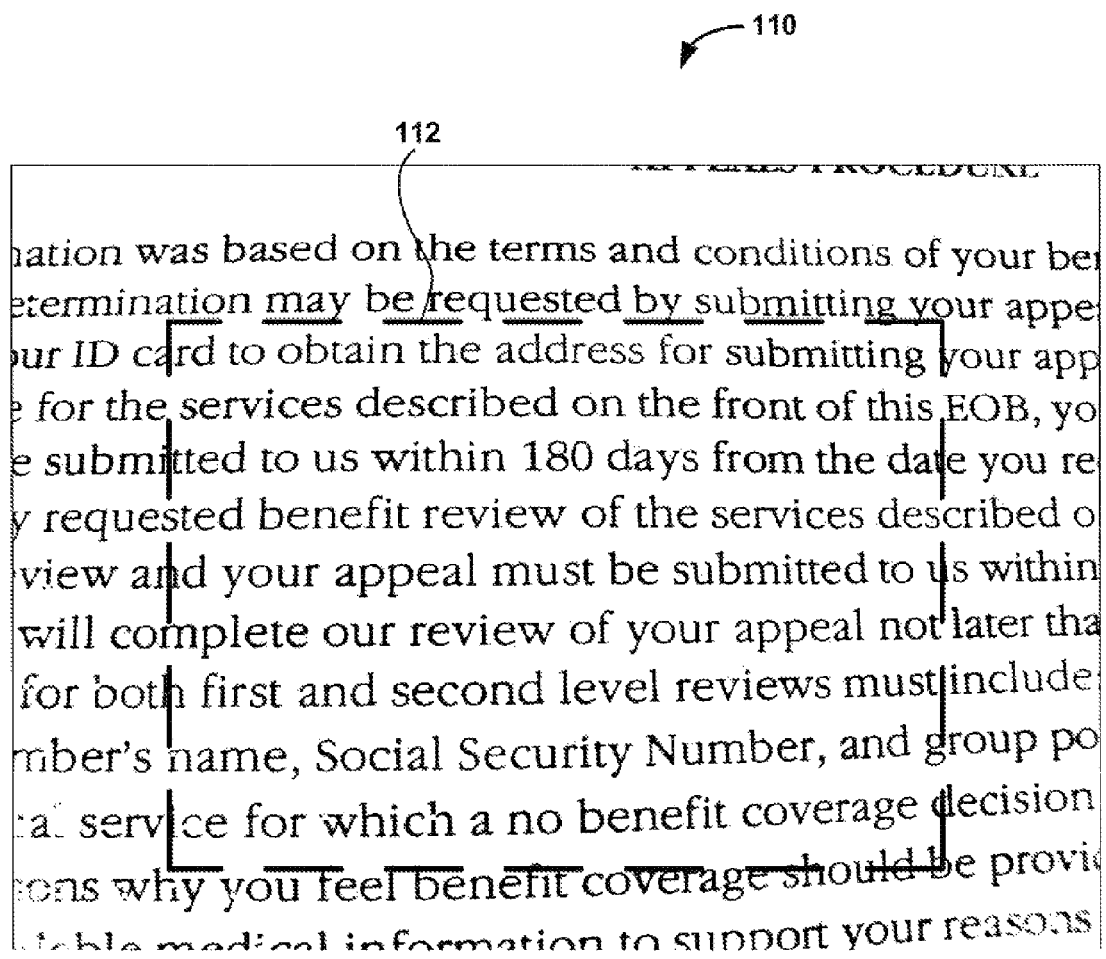

FIG. 7 is another exemplary image 110 to which the automatic color removal techniques of this disclosure may be applied. Image 110 of FIG. 7 represents a captured image of textual document, such as a contract. Image 110 includes a number of lines of text. The text of image 110 has a reddish tone, which may have been caused by the printer from which the textual document was printed.

An image processing apparatus, such as image processing apparatus 14, analyzes color information associated with pixels within a selected portion of image 110, e.g., within box 112, to decide whether to preserve a color component of image 110 during image processing. Image processing apparatus 14 may, for example, classify each pixel of within box 112 of image 110 as a color pixel or non-color pixel based on the analysis of Cb and Cr chrominance values associated with each of the pixels, and decide to preserve the color component of image 110 when the number of color pixels within the selected portion of image 110 is within a color preservation range. In the case of image 110, image processing apparatus 14 classifies each of the pixels associated with letters of the text as color pixels. In other words, the reddish color of the pixels associated with the text of image 110 have enough color to be classified as color pixels. Image processing apparatus 14 classifies all other pixels within box 112 as non-color pixels because they are either white, gray or black pixels.

As described above, image processing apparatus 14 preserves the color component of image 110 when the number of color pixels is within the color preservation range. In the case of image 110, the number of color pixels is not within the color preservation range. For example, the number of color pixels within box 112 exceeds 1/12 of the total number of pixels within box 112. Thus, image processing apparatus 14 dynamically determines that the color component of image 110 is not likely to be considered important to a human viewer because there is too much color in the image. Image processing apparatus 14 therefore removes the color component of image 110. Image processing apparatus 14 may, for example, convert the reddish color of the pixels associated with the text to grayscale.

Figure 8:
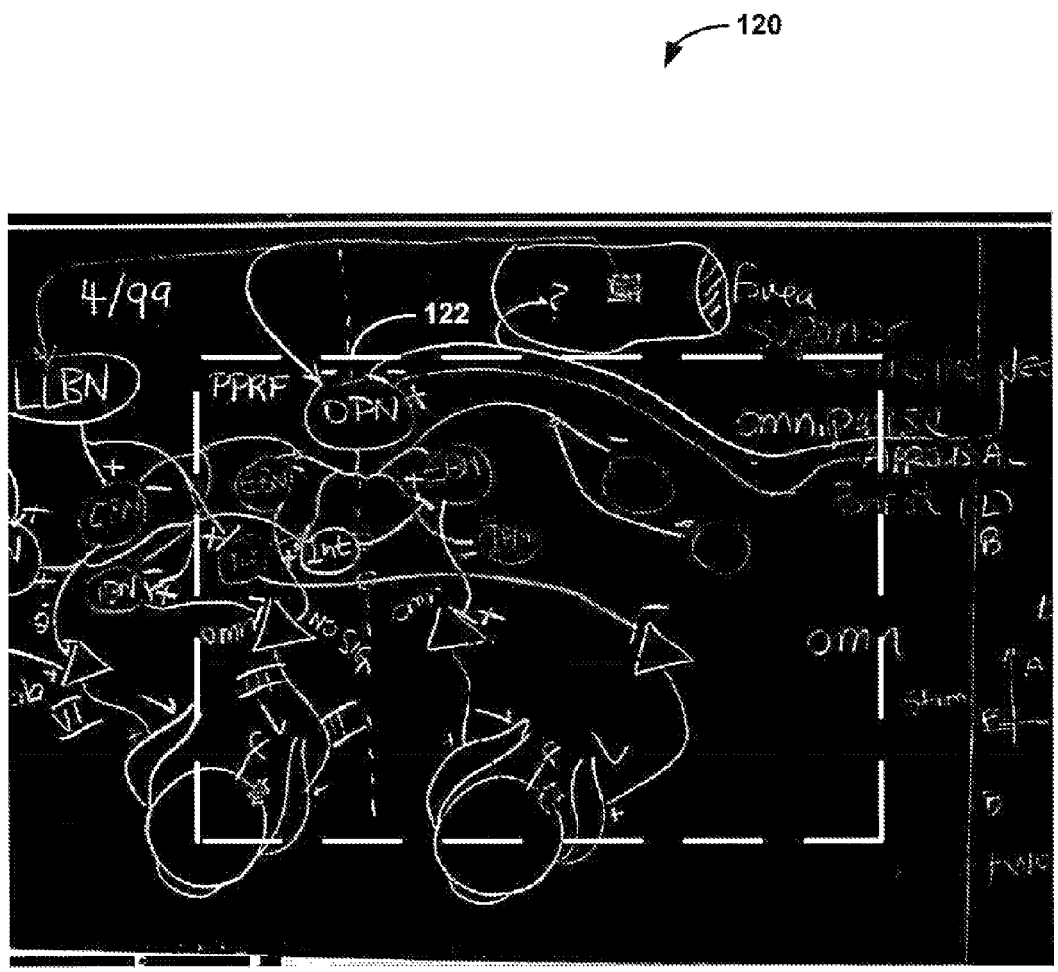

FIG. 8 is another exemplary image 120 to which the automatic color removal techniques of this disclosure may be applied. Image 120 of FIG. 8 represents a captured image of graphical/textual content of a blackboard. Image 120 includes a number of graphical and textual objects. The graphical and textual objects of image 120 are drawn or written with a number of different colored chalks.

An image processing apparatus, such as image processing apparatus 14, analyzes color information associated with pixels within box 122 to determine whether to preserve a color component of image 120 during image processing. Image processing apparatus 14 classifies each of the pixels within box 122 associated with graphical and textual objects that are written in color chalk as color pixels. Image processing apparatus 14 classifies the graphical and textual objects within box 122 that are written in white chalk as non-color pixels. In addition, image processing apparatus 14 classifies the pixels within box 122 that are associated with the blackboard as non-color pixels.

As described above, image processing apparatus 14 preserves the color component of image 120 when the number of color pixels is within the color preservation range. In the case of image 120, the number of color pixels is within the color preservation range. Therefore, image processing apparatus 14 preserves the color component of image 120. In this manner, image processing apparatus 14 dynamically determines that the color component of image 120 is likely to be considered important to a human viewer and preserves the color component of the image.

The techniques described herein may be implemented in hardware, software, firmware, or any combination thereof. If implemented in software, the techniques may be realized in part by a computer readable medium comprising program code containing instructions that, when executed, performs one or more of the methods described above. In this case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The program code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. In some embodiments, the functionality described herein may be provided within dedicated software modules or hardware unit modules configured for encoding and decoding, or incorporated in a combined video encoder-decoder (CODEC).

Various embodiments have been described in this disclosure. These and other embodiments are within the scope of the following claims.

The invention claimed is:

1. A method comprising:
analyzing, with an image processing apparatus, color information associated with pixels of at least a portion of an image to determine whether to count a number of pixels classified as color pixels; and
determining whether to preserve a color component comprising removing at least a portion of the color component when the number of the classified color pixels is less than a minimum threshold or greater than a maximum threshold.

2. The method of claim 1, wherein removing at least a portion of the color component comprises converting the image to grayscale.

3. The method of claim 1, wherein removing at least a portion of the color component comprises reducing a number of color tones of the image.

4. The method of claim 1, wherein analyzing color information associated with each pixel of the portion of the image comprises:
computing, for each pixel, a difference between a first chrominance value and a second chrominance value associated with each pixel; and
classifying pixels as color pixels when the difference between the first and second chrominance values is greater than a chrominance threshold.

5. The method of claim 1, wherein analyzing color information associated with each pixel of the portion of the image comprises:
computing, for each pixel, a difference between at least one chrominance value associated with each pixel and a chrominance value corresponding to no chrominance; and
classifying pixels as color pixels when the computed difference is greater than a chrominance threshold.

6. The method of claim 1, wherein analyzing color information associated with each pixel of the portion of the image comprises:
computing, for each pixel, differences between each red, green and blue value associated with each pixel and the other two of the red, green and blue values associated with each pixel;
summing an absolute value of the computed differences; and
classifying pixels as color pixels when the summed differences are greater than a threshold.

7. The method of claim 1, further comprising transmitting the image over a network after removing the color component.

8. The method of claim 1, further comprising:
determining whether to preserve the color component comprises preserving the color component when the number of pixels classified as color pixels is greater than a minimum threshold or less than a maximum threshold.

9. The method of claim 1, wherein analyzing color information comprises analyzing color information associated with pixels of a center portion of the image.

10. The method of claim 1, further comprising capturing the image with an image capture apparatus.

11. The method of claim 1, further comprising receiving the image over a network.

12. The method of claim 1, wherein the image comprises one of a textual document, a whiteboard, a chalkboard, and an overhead projection.

13. A device comprising a processor configured to analyze color information associated with pixels of at least a portion of an image to determine whether to count a number of pixels classified as color pixels, and remove at least a portion of the color component of the image when the number of pixels classified as color pixels is less than a minimum threshold or greater than a maximum threshold.

14. The device of claim 13, wherein the processor is configured to convert the image to grayscale.

15. The device of claim 13, wherein the processor is configured to reduce a number of color tones of the image.

16. The device of claim 13, wherein the processor is configured to compute, for each pixel, a difference between a first chrominance value and a second chrominance value associated with each pixel and classify pixels as color pixels when the difference between the first and second chrominance values is greater than a chrominance threshold.

17. The device of claim 13, wherein the processor is configured to compute, for each pixel, a difference between at least one chrominance value associated with each pixel and a chrominance value corresponding to no chrominance, and classify pixels as color pixels when the computed difference is greater than a chrominance threshold.

18. The device of claim 13, wherein the processor is configured to compute, for each pixel, differences between each red, green and blue value associated with each pixel and the other two of the red, green and blue values associated with each pixel, sum an absolute value of the computed differences, and classify pixels as color pixels when the summed differences is greater than a threshold.

19. The device of claim 13, wherein the device comprises a wireless communication device, the device further comprising a transmitter to transmit the image over a network after removing the color component.

20. The device of claim 13, wherein the processor is configured to analyze color information associated with each pixel of the portion of the image to determine whether to classify each pixel as a color pixel, count a number of pixels classified as color pixels, and preserve the color component of the image when the number of pixels classified as color pixels is greater than a minimum threshold or less than a maximum threshold.

21. The device of claim 13, wherein the processor is configured to analyze color information associated with pixels of a center portion of the image.

22. The device of claim 13, wherein the device comprises an image capture device, the device further comprising an image capture apparatus that captures the image.

23. The device of claim 13, wherein the device comprises an image processing device, the device further comprising a receiver to receive the image over a network.

24. The device of claim 13, wherein the image comprises one of a textual document, a whiteboard, a chalkboard, and an overhead projection.

25. A computer-readable medium comprising instructions that cause a programmable processor to:
analyze color information associated with pixels of at least a portion of an image to determine whether to count a number of the pixels classified as color pixels the pixels as color pixels; and
determine whether to preserve a color component of the image based on removing at least a portion of the color component when the number of pixels classified as color pixels is less than a minimum threshold or greater than a maximum threshold.

26. The computer-readable medium of claim 25, wherein instructions that cause the processor to remove at least a portion of the color component comprise instructions to convert the image to grayscale.

27. The computer-readable medium of claim 25, wherein instructions that cause the processor to remove at least a portion of the color component comprise instructions to reduce a number of color tones of the image.

28. The computer-readable medium of claim 25, wherein instructions that cause the processor to analyze color information associated with each pixel of the portion of the image comprise instructions to:
compute, for each pixel, a difference between a first chrominance value and a second chrominance value associated with each pixel; and
classify pixels as color pixels when the difference between the first and second chrominance values is greater than a chrominance threshold.

29. The computer-readable medium of claim 25, wherein instructions that cause the processor to analyze color information associated with each pixel of the portion of the image comprise instructions to:
compute, for each pixel, a difference between at least one chrominance value associated with each pixel and a chrominance value corresponding to no chrominance; and
classify pixels as color pixels when the computed difference is greater than a chrominance threshold.

30. The computer-readable medium of claim 25, wherein instructions that cause the processor to analyze color information associated with each pixel of the portion of the image comprise instructions to:
compute, for each pixel, differences between each red, green and blue value associated with each pixel and the other two of the red, green and blue values associated with each pixel;
sum an absolute value of the computed differences; and
classify pixels as color pixels when the summed differences are greater than a threshold.

31. The computer-readable medium of claim 25, further comprising instructions that cause the processor to transmit the image over a network after removing the color component.

32. The computer-readable medium of claim 25, wherein:
instructions that cause the processor to determine whether to preserve the color component comprise instructions to preserve the color component when the number of pixels classified as color pixels is greater than a minimum threshold or less than a maximum threshold.

33. The computer-readable medium of claim 25, wherein instructions that cause the processor to analyze color information comprise instructions to analyze color information associated with pixels of a center portion of the image.

34. The computer-readable medium of claim 25, further comprising instructions that cause the processor to capture the image with an image capture apparatus.

35. The computer-readable medium of claim 25, further comprising instructions that cause the processor to receive the image over a network.

36. A device comprising:
- an image capture apparatus that captures an image of a scene of interest to determine whether to classify the pixels as color pixels; and
- an image processing apparatus that analyzes color information associated with pixels of at least a portion of an image to determine whether to count a number of color pixels and removes at least a portion of the color component of the image when the number of pixels classified as color pixels is less than a minimum threshold or greater than a maximum threshold.

37. The device of claim 36, wherein the image processing apparatus converts the image to grayscale.

38. The device of claim 36, wherein the image processing apparatus reduces a number of color tones of the image.

39. The device of claim 36 wherein the image processing apparatus computes, for each pixel, a difference between a first chrominance value and a second chrominance value associated with each pixel and classifies pixels as color pixels when the difference between the first and second chrominance values is greater than a chrominance threshold.

40. The device of claim 36 wherein the image processing apparatus computes, for each pixel, differences between each red, green and blue value associated with each pixel and the other two of the red, green and blue values associated with each pixel, sums an absolute value of the computed differences, and classifies pixels as color pixels when the summed differences is greater than a threshold.

41. The device of claim 36, wherein the image processing apparatus analyzes color information associated with pixels of a center portion of the image.

42. An apparatus comprising:
- means for analyzing color information associated with pixels of at least a portion of an image to determine whether to count a number of pixels classified as color pixels; and
- means for determining whether to preserve a color component comprising removing at least a portion of the color component when the number of the classified color pixels is less than a minimum threshold or greater than a maximum threshold.

43. The apparatus of claim 42, wherein the analyzing means computes, for each pixel, a difference between a first chrominance value and a second chrominance value associated with each pixel and classifies pixels as color pixels when the difference between the first and second chrominance values is greater than a chrominance threshold.

44. The apparatus of claim 42, wherein the analyzing means computes, for each pixel, differences between each red, green and blue value associated with each pixel and the other two of the red, green and blue values associated with each pixel, sums an absolute value of the computed differences, and classifies pixels as color pixels when the summed differences is greater than a threshold.

45. The apparatus of claim 42, further comprising means for transmitting the image over a network after removing the color component.

46. The apparatus of claim 42, further comprising means for capturing the image with an image capture apparatus.

47. The apparatus of claim 42, further comprising means for receiving the image over a network.

* * * * *